United States Patent
Hellwig et al.

(10) Patent No.: US 9,569,384 B2
(45) Date of Patent: Feb. 14, 2017

(54) CONDITIONAL LINKS FOR DIRECT MEMORY ACCESS CONTROLLERS

(71) Applicant: Infineon Technologies AG, Neubiberg (DE)

(72) Inventors: Frank Hellwig, Wunstorf (DE); Simon Cottam, Bristol (GB); Harald Zweck, Munich (DE)

(73) Assignee: Infineon Technologies AG, Neubiberg (DE)

( * ) Notice: Subject to any disclaimer, the term of this patent is extended or adjusted under 35 U.S.C. 154(b) by 956 days.

(21) Appl. No.: 13/803,811

(22) Filed: Mar. 14, 2013

(65) Prior Publication Data

US 2014/0281098 A1 Sep. 18, 2014

(51) Int. Cl.
G06F 13/28 (2006.01)

(52) U.S. Cl.
CPC ................ G06F 13/28 (2013.01)

(58) Field of Classification Search
CPC ........................................ G06F 13/28
USPC ................... 710/22, 36, 23, 26, 28
See application file for complete search history.

(56) References Cited

U.S. PATENT DOCUMENTS

| | | | | |
|---|---|---|---|---|
| 5,630,048 A * | 5/1997 | La Joie | ............... | G06F 11/25 714/25 |
| 7,523,228 B2 * | 4/2009 | Biran | ............... | G06F 13/28 710/22 |
| 7,555,576 B2 | 6/2009 | Leijten | | |
| 7,721,018 B2 * | 5/2010 | Rajbharti | ............... | G06F 13/28 710/22 |
| 8,433,829 B2 * | 4/2013 | Kwon | ............... | G11C 15/00 710/22 |
| 8,943,238 B2 * | 1/2015 | Birsan | ............... | G06F 13/28 710/22 |
| 2004/0123013 A1 * | 6/2004 | Clayton | ............... | G06F 13/28 710/310 |
| 2006/0179181 A1 * | 8/2006 | Seong | ............... | G06F 13/28 710/22 |
| 2008/0126662 A1 | 5/2008 | Rajbharti | | |

FOREIGN PATENT DOCUMENTS

JP 2004-287654 10/2004

* cited by examiner

*Primary Examiner* — Brian Misiura
(74) *Attorney, Agent, or Firm* — Eschweiler & Associates, LLC

(57) ABSTRACT

Some embodiments relate to a Direct Memory Access (DMA) controller. The DMA controller includes a bus controller having a system bus interface and configured to read a pattern from a memory location via the system bus interface. Pattern comparison logic compares the read pattern to at least one predetermined pattern. Control logic induces the bus controller to process a first conditional link over the system bus interface if the read pattern differs from the predetermined pattern, and induces the bus controller to process a second conditional link over the system bus interface if the read pattern differs from the predetermined pattern.

21 Claims, 5 Drawing Sheets

400

CONDITIONAL LINKS FOR DIRECT MEMORY ACCESS CONTROLLERS

BACKGROUND

Direct memory access (DMA) controllers allow hardware subsystems within a computing system to access memory with limited effort from a central microprocessor unit. To illustrate general DMA functionality, consider the example of FIG. 1A, which illustrates a digital system 100 including a microprocessor 102, memory 104, DMA controller 106, and input/output block 108; all of which are operably coupled via a system bus 110. Without the DMA controller 106, successive read and write operations associated with a large data transfer, for example copying data within memory 104 or moving data to or from I/O block 108, can fully occupy the microprocessor 102 for an extended time period. With the DMA controller 106 in place, however, the microprocessor 102 provides some minimal programming for the DMA controller 106 and, after programming the DMA controller 106, the microprocessor 102 can go about other tasks while the DMA controller handles the data transfer.

More particularly, to transfer data, DMA controller 106 can make use of linked list structure 150, which is stored in memory 104, as shown in FIG. 1B. This linked list structure 150 includes multiple links 152 (e.g., DMA Link 1, DMA Link 2, ..., DMA Link N), where each link includes a data field 154 and a reference field 156. The data field 154 points to data to be transferred for the corresponding link, and the reference field 156 points to the next link in the linked list structure 150. In the example of FIGS. 1A-1B, the microprocessor 102 programs the DMA controller 106 with the first link (DMA Link 1), and the DMA controller 106 subsequently transfers data as specified in the data field 154 of DMA Link 1. The DMA controller 106 then identifies the location of the second link (DMA Link 2) from reference field 156 of the first link, retrieves the second link (DMA Link 2) from memory 104, and transfers data as specified in data field of DMA Link 2. The DMA controller 106 then moves onto the third DMA Link, fourth DMA link, and so on. After all links in the linked list 150 have been processed (i.e., and the full data transfer completed), the DMA controller 106 can flag an interrupt (IRQ) to notify the microprocessor 102 that the data transfer is complete.

Although this conventional linked-list DMA technique allows the microprocessor 102 to offload some computational effort to the DMA controller 106 for large data transfers, these techniques still require ongoing "hold-holding" or management by the microprocessor 102 for the DMA controller 106 for many applications. Aspects of the present disclosure provide DMA controllers that exhibit greater independence from microprocessors, and thus, potentially enhanced system performance.

DETAILED DESCRIPTION

Figure 1A:
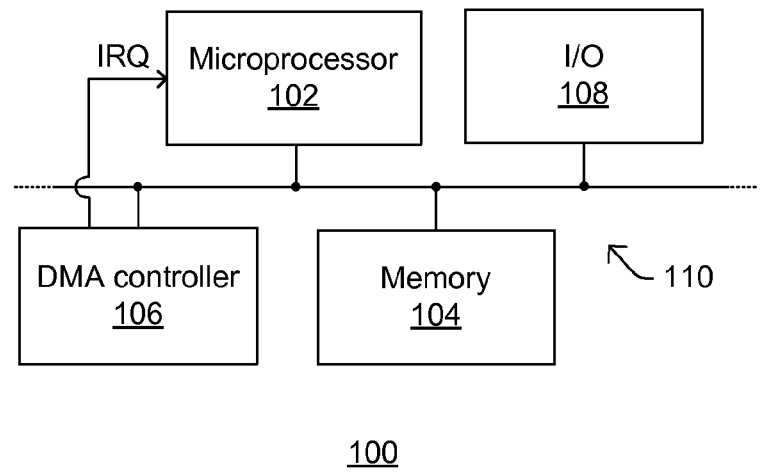
FIG. 1A shows a block diagram of a digital system that makes use of a direct memory access (DMA) controller.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

Figure 1B:
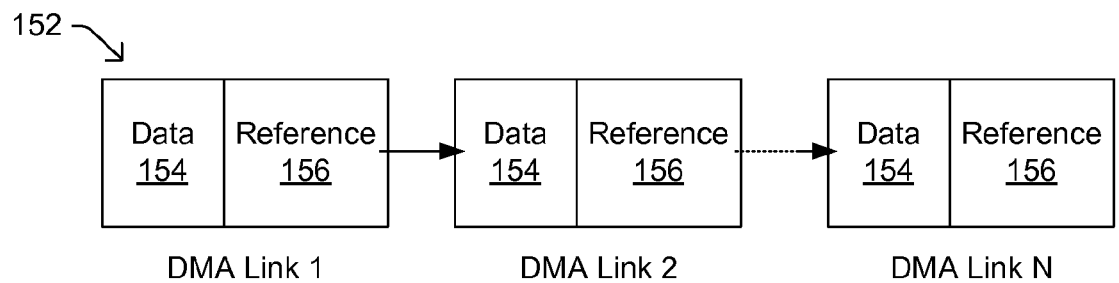
FIG. 1B shows a diagram of a conventional linked list DMA structure.

As will be appreciated in more detail below, the present disclosure relates to DMA controllers that make use of conditional links to transfer data. In contrast to a conventional DMA linked list structure where successive links follow a rigid linear structure (see e.g., FIG. 1B); a conditional DMA linked list can include one or more conditional links which are only processed if certain conditions are met.

Figure 2A:
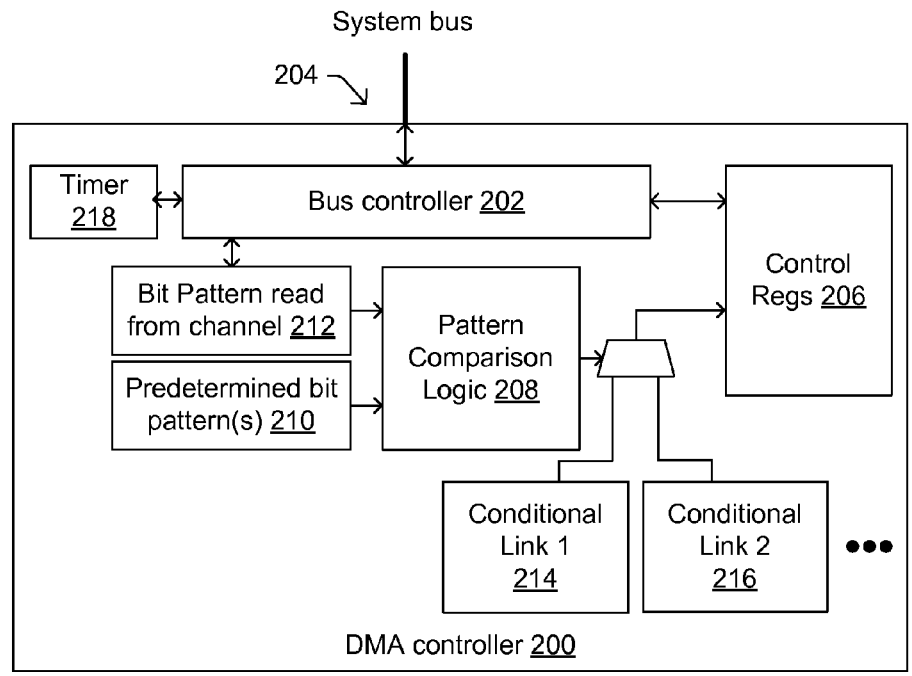
FIG. 2A shows a DMA controller in accordance with some embodiments.

FIG. 2A shows an example of a DMA controller 200 in accordance with some embodiments. The DMA controller 200 includes a bus controller 202 having a system bus interface 204, as well as control registers 206 and pattern comparison logic 208. The DMA controller 200 also includes a first pattern memory element 210, such as a register or a hardwired data value, that stores one or more predetermined bit pattern(s) of interest, and a second pattern memory element 212, such as a register, to store a pattern read from over the system bus interface 204. Conditional links (e.g., conditional link 1, conditional link 2, ...), or pointers to such conditional links, are stored in link memory elements (e.g., 214, 216, ...).

During operation, the DMA controller 200 reads a bit pattern from over the system bus interface 204 and stores the read bit pattern in second pattern memory element 212. After the bit pattern is read from over the system bus interface 204, the pattern comparison logic 208 then compares the read bit pattern in second pattern memory element 212 with the predetermined pattern stored in first pattern memory element 210 to see if the two patterns match. If the patterns do match, then the pattern comparison logic 208 sets the control registers 206 based on the first conditional link (e.g., stored in first link memory element 214). On the other hand, if the patterns are different, then the pattern comparison logic 208 sets the control registers 206 based on the second conditional link (e.g., stored in second link memory element 216). The first and second conditional links can have different source and destination pointers from one another. In this way, the DMA controller 200 can process different conditional links, which point to data in different memory locations, based on the bit pattern read from over the system bus interface 204. In many applications, selective processing of these "conditional" links adds additional functionality and autonomy to the DMA controller 200, and thus limits the amount of processor management required for the DMA controller, thereby potentially improving system performance.

In some cases, the bus controller 202 reads this bit pattern stored in 212 by polling a memory location, such as a control register or status register of a peripheral. In "polling" this memory location, it will be understood that the DMA controller 200 repeatedly reads the memory location to check for a change in the bit pattern stored therein. Polling occurs without management being required by a microprocessor, and thus, lends some additional autonomy to the DMA controller 200. Typically, polling is done at a regular interval over the system bus interface 204, but it can also be done at irregular time intervals.

Although "polling" can make the DMA controller 200 more autonomous, it can also consume additional bandwidth on the system bus interface 204 compared to DMA controllers that are solely interrupt based. For example, although polling a memory location every clock cycle would allow the DMA controller 200 to detect an exact clock cycle at which the bit pattern in the memory location changes, this approach can tie up the system bus throughout the polling process. On the other hand, by polling too infrequently, the DMA controller 200 may detect a change in bit pattern over the system bus too late, or even miss such a change in bit pattern altogether. Therefore, to provide users with some flexibility in the rate at which the DMA controller 200 polls the memory location over the system bus interface 204, some embodiments of the DMA controller 200 include a programmable timer 218 that sets the polling rate. After being set to an initial value, the timer 218 can incrementally "count down" and read the memory location only when the timer reaches a predetermined value (e.g., zero). After the memory location is read, the timer 218 is reset to the initial value, counts down again, and re-reads the memory location when the predetermined value is again reached. By setting the timer 218 to a relatively large initial value, the polling rate is relatively low (e.g., slow polling), which consumes limited bandwidth on system bus, albeit with imprecise detection of bit pattern changes. On the other hand, by setting the timer 218 to a relatively small initial value, the polling rate is relatively high (e.g., fast polling), which provides relatively precise detection of bit pattern changes, albeit while consuming more bandwidth on the system bus. Rather than "counting down", the counter could alternatively count up from some initial value until some predetermined value is reached.

Figure 2B:
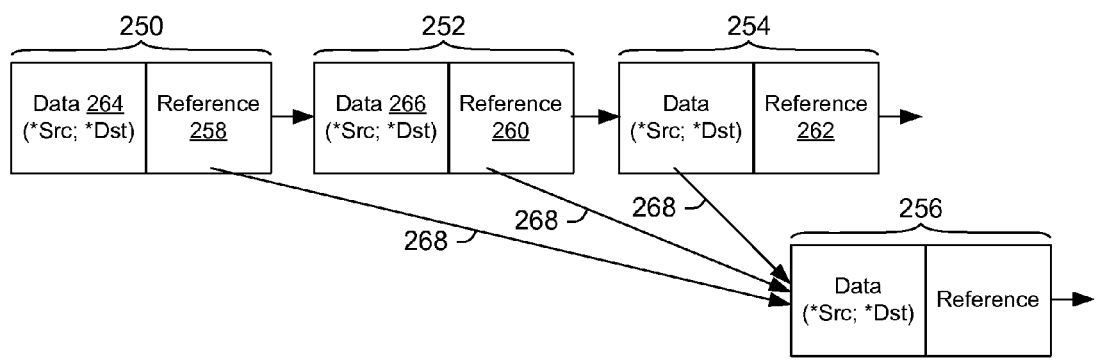
FIG. 2B shows execution of a conditional linked list in accordance with some embodiments.

FIG. 2B shows another example of how conditional links can be processed. FIG. 2B shows four links (e.g., first link 250, second link 252, third link 254, and fourth link 256) where the third and fourth links 254, 256 point to additional downstream links that are not shown for purposes of simplicity and clarity. Each link includes a data field describing a data transfer to be executed and a reference field pointing to the next link in the linked list structure to be processed. Thus, the first link reference field 258 points to the second link 252, the second link reference field 260 points to the third link 254, and the third link reference field 262 points to a downstream (un-illustrated) link. The fourth link 256, however, is not necessarily specified in the first through third reference fields 258-262, but rather is a conditional link as will be appreciated in greater detail below.

A more detailed description of how FIG. 2B's links are processed is now described concurrently with reference to FIG. 2A. To process these links, a microcontroller or other peripheral writes a base address of the first link 250 (or writes the contents of the first link itself) to the DMA control registers 206. Upon receiving the address of the first link 250 (or the contents of the first link 250), the DMA controller identifies a source address and destination address describing a data transfer specified by first link data field 264, and also identifies a link address in first link reference field 258 where the second link 252 is stored. After the source and destination addresses have been identified from 264, the DMA controller 200 commences transferring data from the source address to the destination address, often in word-by-word fashion and/or with burst operations. For example, data transfer can occur by the DMA controller reading successive words starting at the source base address and incrementing a counter to read successive words from the source base address plus an offset to read a data size corresponding to the first link, and similarly writing data words to a destination base address plus an offset for successive words.

As the data is transferred from source to destination for the first link 250, the pattern comparison logic 208 compares the bit pattern of each transferred data word (or multiple data words) to the predetermined bit pattern stored in 210. So long as the bit pattern of a transferred data word differs from the predetermined bit pattern, the DMA controller 200 moves on to process the second link 252 after the data transfer specified by the first link is complete, often without generation of an interrupt.

In processing the second link 252, the DMA controller identifies source and destination addresses specified in the second link data field 266, and commences transferring data from the source address to the destination address while comparing each transferred word to the predetermined bit pattern stored in 210. So long as the bit pattern of the transferred data differs from the predetermined bit pattern stored in 210, the DMA controller completes data transfer specified in second link 252, and moves on to successive links (e.g., 254, . . . ) in time.

If at any time the bit pattern of the transferred data matches the bit-pattern stored in 210, then the DMA controller 200 stops the data transfer and branches to an alternate conditional link—here the fourth link 256 (see lines 268). This alternate conditional link can be a default value which is stored in 216 and which is processed only when a bit-pattern match between 212 and 210 occurs. For example, in some embodiments the predetermined bit-pattern stored in 210 can indicate the most recently transferred data word is an end-of-file or end-of-packet word, and the alternate conditional link 256 can point to an address where the next file or packet is expected to be. Thus, when a word in the transferred data matches the pre-determined bit pattern at any point, the DMA controller 200 jumps to the fourth link 256, but otherwise continues processing the linked list structure made up of the first, second, and third links 250-254. Rather than comparing data actually transferred in memory, the DMA controller can also poll a status or control register while a data transfer is occurring, and thus branch to the fourth link 256 if the polled register value matches the predetermined pattern in 210.

Figure 3A:
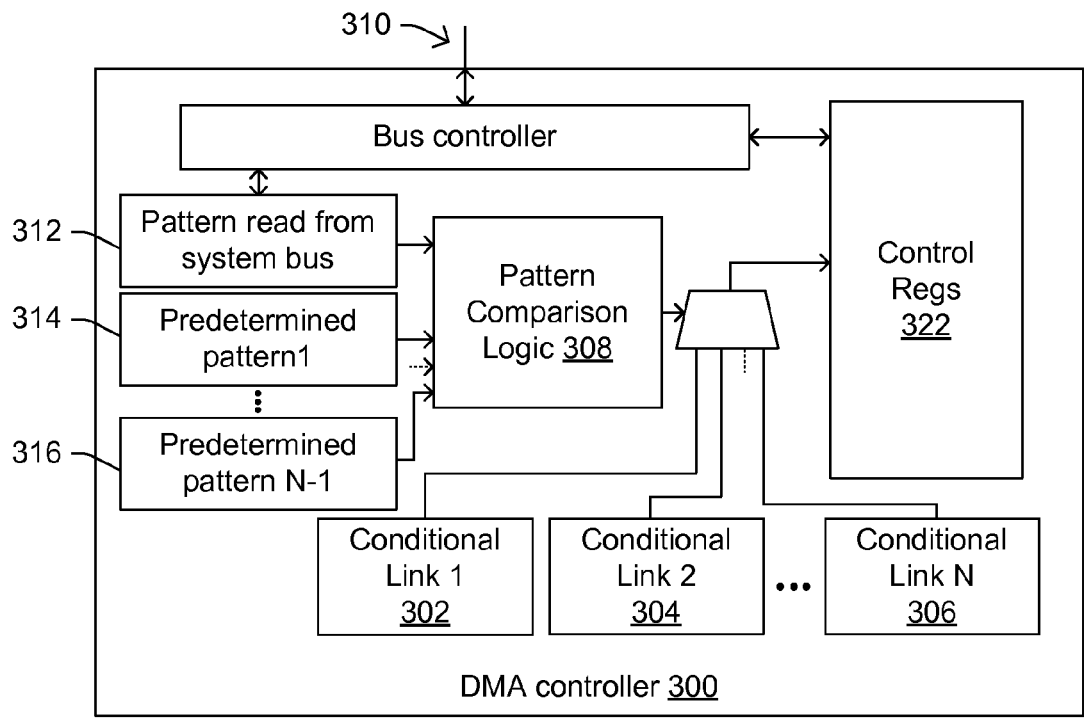
FIG. 3A shows a DMA controller in accordance with some embodiments.

Although FIGS. 2A-2B illustrate only a single predetermined bit pattern stored in 210 being compared, this concept extends to any number of predetermined bit-patterns, each of which can cause execution of a different conditional link. To this end, FIG. 3A shows an example DMA controller 300 where N conditional links are present (see 302 through 306). To determine which conditional link is to be processed at a given time, pattern comparison logic 308 can compare the bit pattern read over system bus stored in 312 with each of N−1 predetermined patterns stored in respective memory elements 314 through 316. For example, a first predetermined pattern stored in 314 might have a digital value of b'00001 and correspond to first link in 302, a second predetermined pattern might have a digital value of b'00010 and correspond to second link in 304, and so on. If the bit pattern read from the over the system bus (310) matches one of predetermined patterns, then the DMA controller performs a data transfer based on a conditional link corresponding to that predetermined pattern. For example, if a digital value of b'0010 is read from system bus, then the DMA controller will perform a data transfer specified in conditional link 2. If the read bit pattern doesn't match any of the predetermined patterns, than a default conditional link (e.g., Conditional Link N) can be processed in some embodiments. Thus, the links stored in DMA controller are "conditional" in that which link is actually executed by the DMA controller depends on whether the data read by the DMA matches one of the predetermined pattern.

Figure 3B:
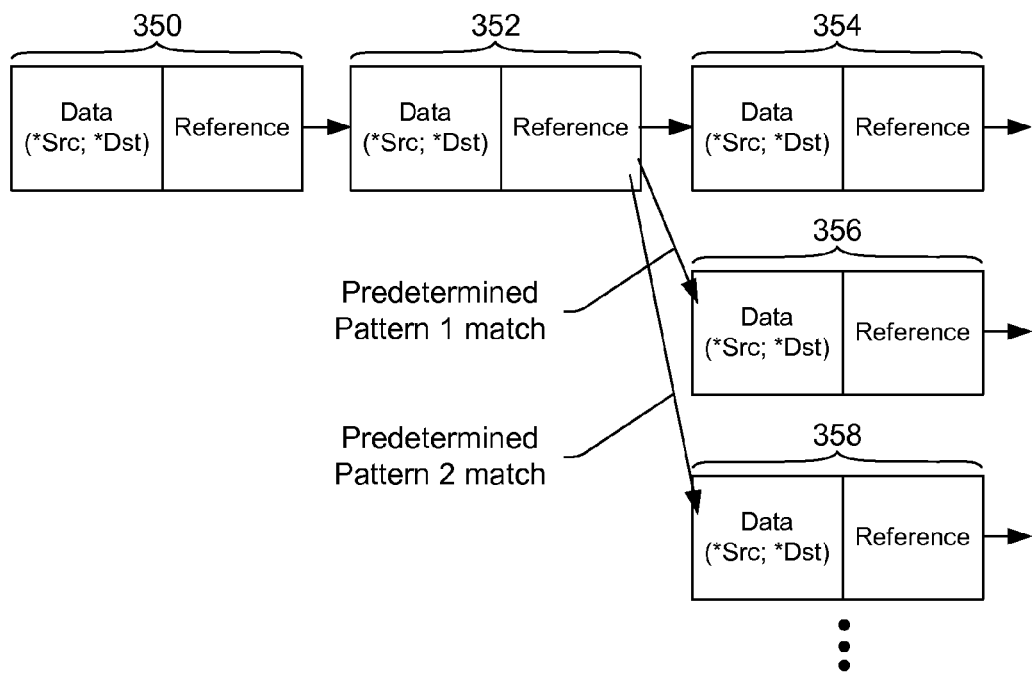
FIG. 3B shows execution of a conditional linked list in accordance with some embodiments.

FIG. 3B shows a linked list structure corresponding to FIG. 3A's embodiment. Somewhat akin to FIG. 2B, the linked list structure includes multiple links 350-354, which each have a reference field that explicitly points to the next sequential link in the linked list structure, while addresses of conditional links 356 and 358 are not necessarily explicitly mentioned in the links 350-354 (or any other links of the linked list structure). So long as there is no pattern match, the DMA controller continues with processing of links 350-354, but when a pattern match occurs, the DMA controller jumps to the conditional link corresponding to the matched pattern.

In some implementations, the DMA transaction can be a loop (e.g., endless transaction) that stops only when a transferred data word matches a predetermined pattern.

Figure 4:
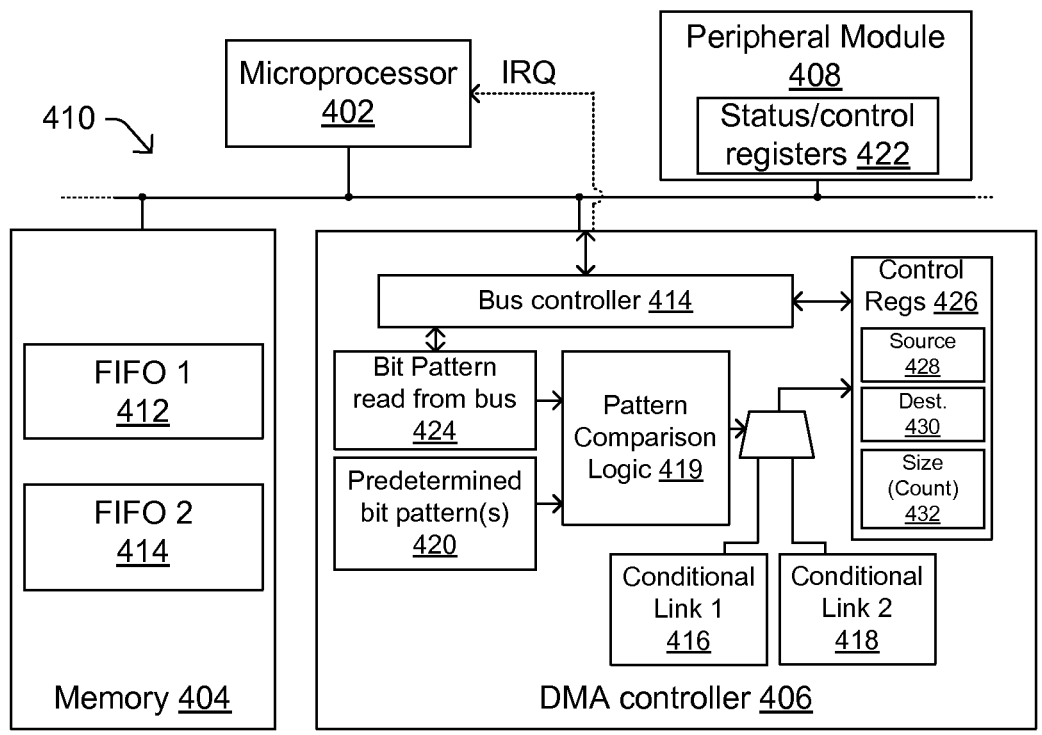
FIG. 4 shows a block diagram of digital system having a DMA controller in accordance with some embodiments.

To illustrate an example context where such DMA controllers may be advantageous, FIG. 4 shows a digital system 400 in accordance with some embodiments. The digital system 400 includes a microprocessor 402, memory 404, DMA controller 406, and peripheral module 408, all of which are operably coupled via a system bus 410. In this example, the memory 404 includes a first first-in-first-out (FIFO) 412 and a second FIFO 414 for purposes of illustration. An optional interrupt controller (not shown), which receives and prioritizes interrupt requests (IRQs) from DMA controller 406 and multiple respective peripherals (e.g., including 408), may also be present in some implementations.

To effectuate efficient data transfer, microprocessor 402 can program a first conditional link into first link memory element 416, a second conditional link into second memory element 418, and predetermined pattern to first pattern memory element 420. In the following example, the first conditional link in 416 points to first FIFO 412 and the second conditional link in 418 points to second FIFO 414. Alternatively, the first and/or second conditional links can be hard-coded, and/or the pre-determined pattern can be hard-coded. Hard-coding can be accomplished by tying the bits to power or ground lines in a mask or by blowing fuses during manufacture to set the hard-coded values, for example.

During operation, in this example, the peripheral module 408 receives a data stream made up of packets and writes each packet to first FIFO 412 or second FIFO 414. As the peripheral module 408 writes each packet, it updates its status and/or control registers 422 to indicate whether the most recent packet has been written to the first FIFO 412 or the second FIFO 414.

The DMA controller 406, which attempts to process the received packets in some fashion, polls the status or control registers 422 and stores the read status or control register bit pattern in second memory element 424. If the read status or control register bit pattern stored in 424 matches the predetermined bit pattern stored in 420, then the DMA controller processes the first conditional link in 416. This can occur, for example, if the status/control register value in 422 (read and stored in 424) indicates that the most recent packet has been written to first FIFO 412, and thus, the DMA controller 406 sets its control registers 426 based on the first conditional link in 416 and processes the packet just written to first FIFO 412. On the other hand, if the read status or control register bit pattern in 422 does not match the pre-determined pattern in 420, then the DMA controller processes the second conditional link in 418. In this example, this can occur when the peripheral module outputs a status/control register value to 422 (now stored in 424) that indicates the most recent packet has been written to second FIFO 414, and thus, the DMA controller 406 sets its control registers 426 based on the second conditional link in 418 and processes the packet just written to second FIFO 414. The first and second conditional links are often part of separate linked list structures, in that the first conditional link does not point to the second conditional link (or vice versa).

The first and second conditional link structures, as stored in memory 404, can each include DMA control information and pointers. For example, each conditional link can include a source address field (loaded into source register 428), which points to base address of a first source data block from which DMA controller is to read data. Each conditional link also includes a destination address field (loaded into destination register 430), which points to base address of first destination block where DMA controller is to write the first source data block. Each conditional link also includes a size field (loaded into register 432), which specifies the size of the source data block to be transferred. To effectuate a transfer with limited management from the microprocessor, the DMA controller 406 reads a first data word at the base address of the first source data block, and then writes that first data word to the base address of the first destination block. The DMA controller then increments a counter to represent an offset from the first base address, and then reads a second data word from the base address plus that offset. This second data word is then written to the destination base address (plus the offset). Additional words are read from the source data block and written to the destination data block by successively incrementing the counter to keep track of the offset. The data transfer is stopped when the counter value (or a scaled version thereof) corresponds to the data size specified in the link.

Each conditional link can point to another link to give rise to a linked list. When viewed as a collective, the links of each linked list can "gather" source data scattered across non-contiguous memory locations and/or can "scatter" data across non-contiguous destination addresses. The first and/or second conditional links (and any linked list structures associated therewith), can be executed in one continuous DMA operation without any generating an interrupt and/or without requiring instructions from a microprocessor between data transfer operations in some circumstances.

Figure 5:
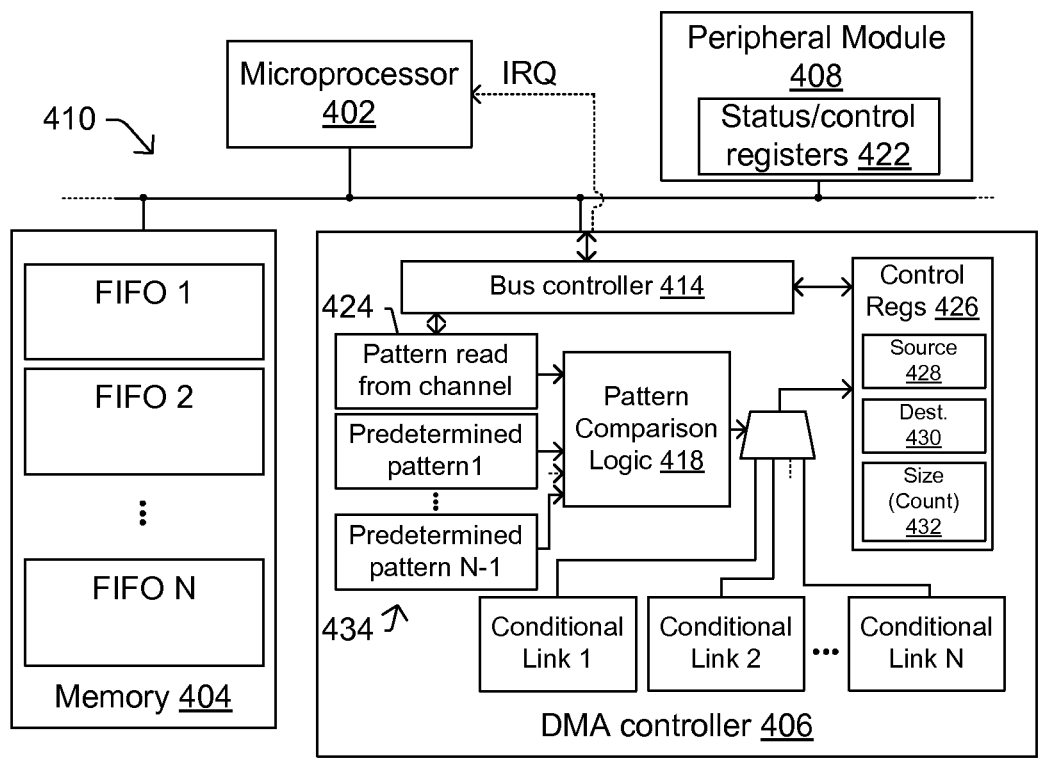
FIG. 5 shows a block diagram of digital system having a DMA controller in accordance with some embodiments.

Although FIG. 4 only illustrates two conditional links which are selected based on whether the read status/control bit pattern matches a predetermined bit pattern of interest, this concept extends to any number of conditional links. Thus, FIG. 5 shows an example DMA controller 406 where N conditional links are present, where each conditional link points to a different one of N FIFOs in memory 404. To determine which conditional link is to be processed at a given time, pattern comparison logic 419 can compare the bit pattern read from status or control register with each of N−1 predetermined patterns stored in respective memory elements. For example, a first predetermined pattern might have a digital value of b'00001, corresponding to a digital value output to status/control registers when peripheral has written data to first FIFO (FIFO1); a second predetermined pattern might have a digital value of b'00010, corresponding to a digital value output to status/control registers when peripheral has written data to second FIFO (FIFO2), and so on. If the bit pattern read from the status or control register 422, which is stored in 424 within DMA 406, matches one of predetermined patterns stored within 434, then the DMA controller performs a data transfer based on a conditional link corresponding to that predetermined pattern. For example, if a digital value of b'0010 is read from status/control registers 422, then the DMA controller will read data from the second FIFO. If the read pattern doesn't match any of the predetermined patterns, than a default conditional link (e.g., Conditional Link N) is processed. Thus, the links stored in DMA controller are "conditional" in that which link is actually executed by the DMA controller depends on whether at least one predetermined condition is met or not met.

Thus, it will be appreciated that some embodiments relate to a system. The system includes a direct memory access (DMA) controller coupled to a system bus, and a peripheral including a status or control register accessible to the DMA controller over the system bus. The DMA controller is configured to poll the status or control register to determine a status or control pattern. The DMA controller selectively processes a first conditional link when the status or control pattern matches a pre-determined pattern, and selectively processes a second conditional link when the status or control pattern differs from the pre-determined pattern.

Another embodiment relates to a Direct Memory Access (DMA) controller. The DMA controller includes a bus controller having a system bus interface and configured to read a memory location to determine a pattern via the system bus interface. Pattern comparison logic compares the determined pattern to at least one predetermined pattern. Control logic induces the bus controller to process a first conditional link over the system bus interface if the determined pattern matches the predetermined pattern. The control logic induces the bus controller to process a second conditional link over the system bus interface if the determined pattern differs from the predetermined pattern.

Still another embodiment relates to a method of operating a DMA controller. This method reads a pattern via a system bus coupled to the DMA controller. The method compares the determined pattern to at least one predetermined pattern, where the predetermined pattern is determined prior to pattern being read. The method then processes a first conditional link if the determined pattern matches the predetermined pattern, and processes a second, different conditional link if the determined pattern differs from the predetermined pattern.

It is to be understood that in the description of embodiments contained herein any direct connection or coupling between functional blocks, devices, components, circuit elements or other physical or functional units shown in the drawings or described herein could also be implemented by an indirect connection or coupling, i.e., a connection or coupling comprising one or more intervening elements. Furthermore, it should be appreciated that functional blocks or units shown in the drawings may be implemented as separate circuits in some embodiments, but may also be fully or partially implemented in a common circuit or common integrated circuit in other embodiments, or in some cases may also be implemented jointly by programming a processor accordingly.

It should be noted that the drawings are provided to give an illustration of some aspects and features of embodiments of the present invention and are to be regarded as schematic only. In particular, the elements shown in the drawings are not necessarily to scale with each other, and the placement of various elements in the drawings is chosen to provide a clear understanding of the respective embodiment and is not to be construed as necessarily being a representation of the actual relative location of the various components and elements shown. The features of the various embodiments described herein may be combined with each other. On the other hand, describing an embodiment with a plurality of features is not to be construed as indicating that all those features are necessary for practicing the present invention, as other embodiments may comprise less features and/or alternative features.

What is claimed is:

1. A Direct Memory Access (DMA) controller, comprising:
   a bus controller having a system bus interface and configured to read a pattern from a memory location via the system bus interface;
   pattern comparison logic configured to compare the read pattern to at least one predetermined pattern; and
   control logic configured to induce the bus controller to process a first conditional link over the system bus interface if the read pattern matches the predetermined pattern, and further configured to induce the bus controller to process a second conditional link over the system bus interface if the read pattern differs from the predetermined pattern.

2. The DMA controller of claim 1, further comprising:
   a first link memory element to store the first conditional link;
   a second link memory element to store the second conditional link; and
   a third link memory element to store a third conditional link;
   wherein the control logic is configured to induce the bus controller to process the first conditional link over the system bus interface if the read pattern matches a first predetermined pattern, and further configured to induce the bus controller to process the second conditional link over the system bus interface if the read pattern matches a second predetermined pattern, and further configured to induce the bus controller to process a third conditional link over the system bus interface if the read pattern differs from the first and second predetermined patterns, wherein the first and second predetermined patterns are different.

3. The Direct Memory Access (DMA) controller of claim 1, wherein the control logic is configured to process a sequence of links arranged in a linked list in memory coupled to the system bus interface, wherein the linked list describes a data transfer to be processed by the DMA controller.

4. The DMA controller of claim 1, wherein the first conditional link specifies a data size and a first base address, and wherein the DMA controller reads successive words starting at the first base address and increments a counter to read successive words from the first base address plus an offset to read the data size corresponding to the first link.

5. The DMA controller of claim 1, wherein the read pattern corresponds to a status or control bit pattern read according to a polling rate from a status or control register of a peripheral coupled to the system bus interface.

6. The DMA controller of claim 5, wherein a time between successive polling read operations is programmable or wherein a polling rate is programmable.

7. The DMA controller of claim 6, further comprising:
a programmable timer, wherein a timer value programmed into the programmable timer sets the time between successive polling read operations or sets the polling rate.

8. The DMA controller of claim 1, wherein the first conditional link included in a linked list structure which is made up of multiple links and which is being currently executed by the DMA controller, and wherein the second conditional link is not specified in the linked list structure.

9. A method of operating a direct memory access (DMA) controller, comprising:
reading a pattern from over a system bus coupled to the DMA controller;
comparing the read pattern to at least one predetermined pattern, where the predetermined pattern is determined prior to the pattern being read; and
processing a first conditional link if the read pattern matches the predetermined pattern, and processing a second, different conditional link if the read pattern differs from the predetermined pattern.

10. The method of claim 9, wherein reading the pattern from over the system bus comprises polling a status or control register of a peripheral coupled to the system bus.

11. The method of claim 10, further comprising:
setting a time between successive polling read operations to different time values or setting a polling rate to different polling rates.

12. The method of claim 9, further comprising:
comparing the determined pattern to a first predetermined pattern and a second predetermined pattern;
processing the first conditional link if the determined pattern matches the first predetermined pattern;
processing the second conditional link if the determined pattern matches the second predetermined pattern; and
processing a third conditional link if the determined pattern differs from the first and second predetermined patterns.

13. The method of claim 11, wherein the first, second, and third conditional links are continuously processed without exchanging communication with a microprocessor between a first time when the first conditional link is processed and a third time when the third conditional link is processed.

14. A system, comprising:
a direct memory access (DMA) controller coupled to a system bus; and
a peripheral including a status or control register accessible to the DMA controller over the system bus, wherein the status or control register is configured to store a bit pattern that is indicative of a memory location to which a data packet is stored;
wherein the DMA controller is configured to poll the status or control register to determine a bit pattern associated therewith, and is further configured to selectively process a first conditional link when the bit pattern matches a pre-determined pattern and to selectively process a second conditional link when the bit pattern differs from the pre-determined pattern.

15. The system of claim 14, wherein the first conditional link points to a first address residing within a first memory element coupled to the system bus, and wherein the second conditional link points to a second, different address residing within a second memory element coupled to the system bus.

16. The system of claim 15, wherein the first memory element is a first first-in-first-out (FIFO).

17. The system of claim 16, where the second memory element is a second FIFO that stores data independently of the first FIFO.

18. The system of claim 14, further comprising:
a microprocessor coupled to the system bus and configured to communicate with the DMA controller over the system bus; and
wherein the DMA controller continuously processes the first and second conditional links without exchanging communication with the microprocessor between a first time when the first conditional link is processed and a second time when the second conditional link is processed.

19. The system of claim 14, wherein the first conditional link specifies a data size and a first base address, and wherein the DMA controller reads a first data word at the first base address and increments a counter to represent the first base address plus successive offsets to read successive words of a block of data indicated in the first conditional link until the data size is transferred.

20. The system of claim 14, wherein a time between successive polling read operations is programmable or wherein a polling rate is programmable.

21. The system of claim 20, wherein the DMA controller includes a programmable timer, wherein a timer value programmed into the programmable timer sets the time between successive polling read operations or sets the polling rate.

* * * * *